United States Patent [19]

Dalton

[11] 4,076,299
[45] Feb. 28, 1978

[54] DETACHABLE TRUCK BODY

[75] Inventor: Thomas B. Dalton, Muskegon, Mich.

[73] Assignee: Westran Corporation, Muskegon, Mich.

[21] Appl. No.: 697,485

[22] Filed: Jun. 18, 1976

[51] Int. Cl.² ............................................. B60P 1/64
[52] U.S. Cl. ................................... 296/35 A; 214/515
[58] Field of Search ........................... 296/35 A, 35 R; 214/412, 415

[56] References Cited

U.S. PATENT DOCUMENTS

| | | | |
|---|---|---|---|
| 2,934,373 | 4/1960 | Doty | 214/515 |
| 3,119,503 | 1/1964 | Herpich | 296/35 A |
| 3,186,570 | 6/1965 | Bunnell | 214/515 |
| 3,773,199 | 11/1973 | Arvidsson | 214/515 |

*Primary Examiner*—Philip Goodman
*Attorney, Agent, or Firm*—Gifford, Chandler, Sheridan & Sprinkle

[57] ABSTRACT

A detachable truck body adapted to be mounted onto the bed of a truck is provided and comprises a substantially horizontal base and a plurality of support legs pivotally secured to the base and movable between a first and second pivotal position. In their first pivotal position, each of the support legs extends downwardly and laterally outwardly from the base and engages a ground supporting surface to maintain the base in an elevated position while bracing the base against lateral movement. With the base elevated the bed of a truck can be moved into position underneath the truck body. In their second pivotal position each of the support legs is in a substantially horizontal position adjacent to and underneath the base of the truck body so that the truck body may be transported by the truck bed. First and second locking means are provided for locking the support legs in their first and second pivotal positions, respectively.

22 Claims, 8 Drawing Figures

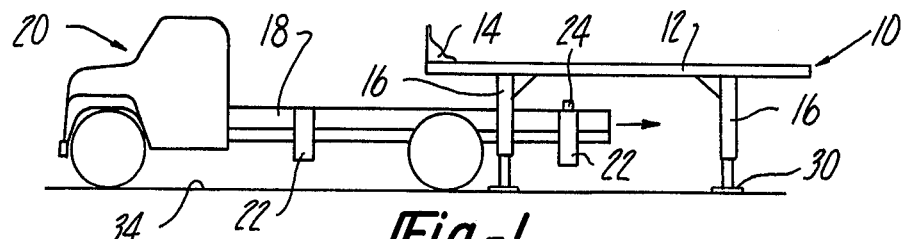
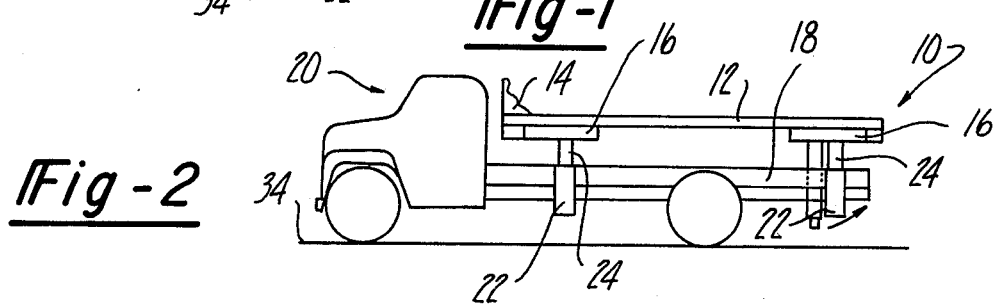
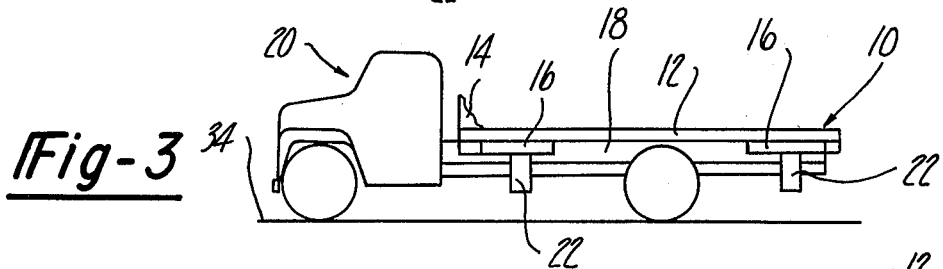
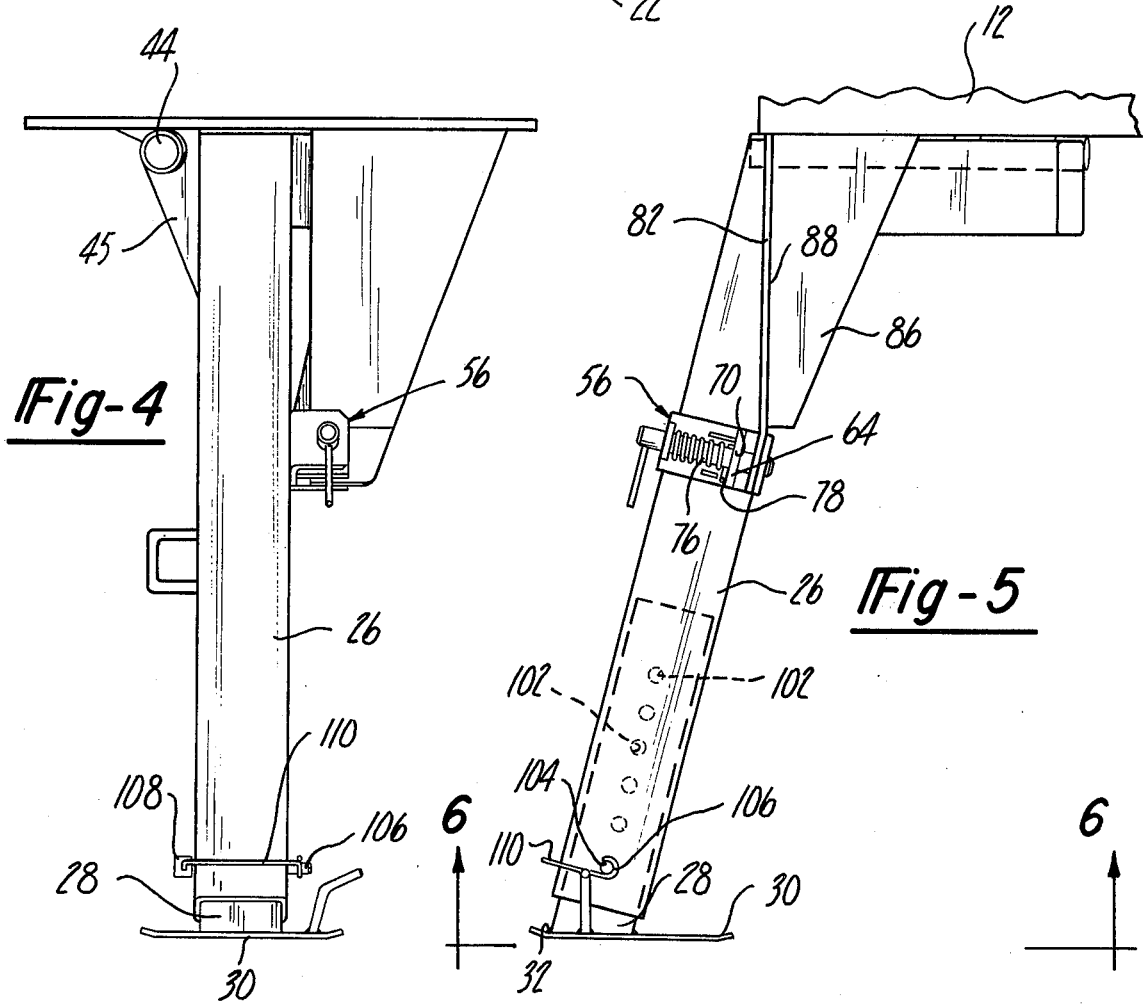

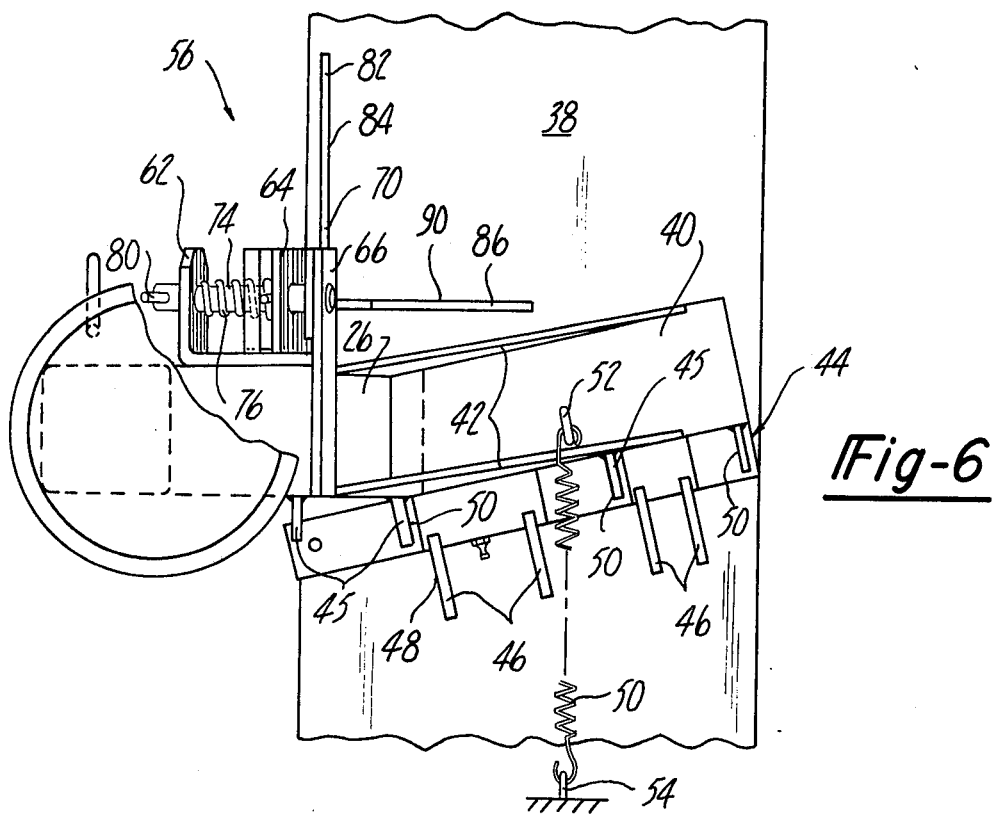
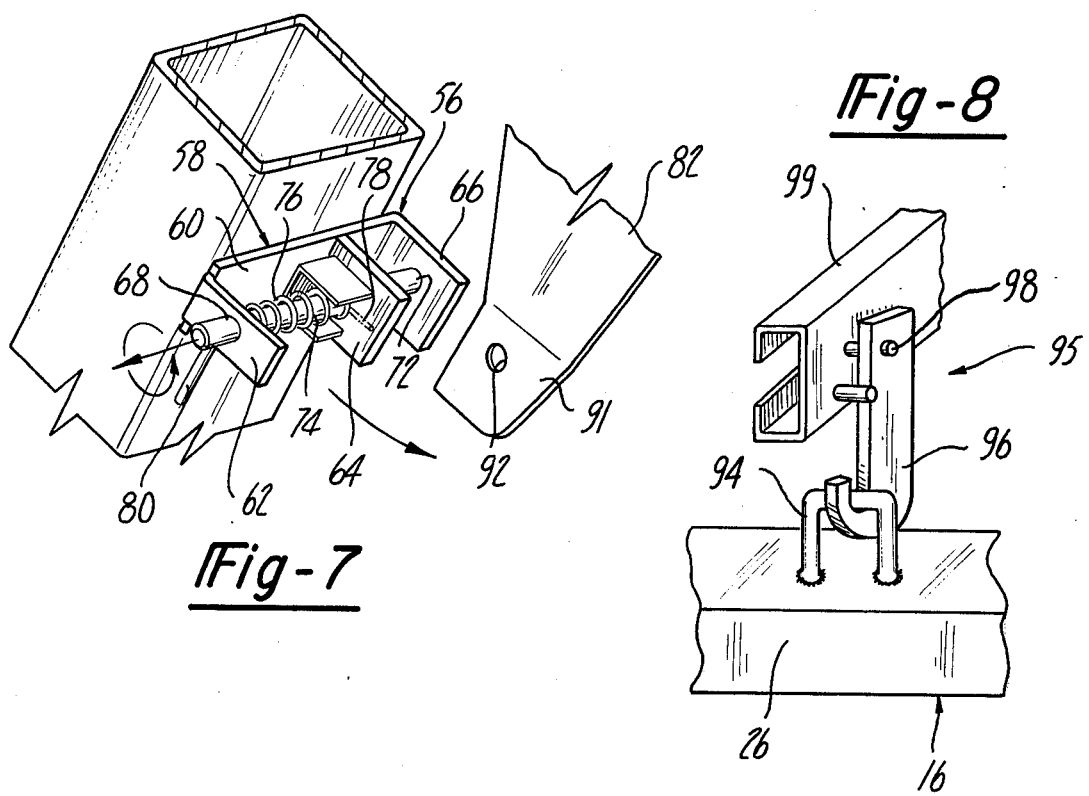

DETACHABLE TRUCK BODY

BACKGROUND OF THE INVENTION

I. Field of the Invention

The present invention relates generally to truck bodies and more particularly, to a detachable truck body having support legs for maintaining the truck body in an elevated horizontal position.

II. Description of the Prior Art

There are several previously known truck bodies which are detachably mounted to the bed of a truck. When these previously known truck bodies are detached from the truck bed, the truck bodies typically rest on their base on the ground supporting surface. Thus, in order to reattach the truck body to the truck bed, the truck body must be elevated onto the truck bed and there have been several previously known means for so elevating the truck body.

One such means for elevating the truck body comprises a crane separate from both the truck body and the truck. With this system, the crane mechanically lifts the truck body from and onto the truck bed. The disadvantage of this system, however, is that the crane is not only expensive to obtain but also to operate. Moreover, the crane is typically stationary so that the truck bodies may be detached and attached to the truck bed only at a single location which limits the flexibility of the detachable truck body.

With a still further type of detachable truck body system, a detachable truck body is slidably attached to a rail and a dump actuator selectively tilts the rail with the attached truck body. Thus, in order to detach the truck body from the truck bed, the dump actuator is extended so that the truck body slides rearwardly off the rail and onto the ground supporting surface. In order to reattach the truck body to the truck bed, a power actuated sling engages the bottom of the truck body and drags the truck body up onto the rail and hence onto the truck bed.

This type of detachable truck body system, however, is disadvantageous in several respects. One disadvantage is that the dump actuator, rail and power sling components on the truck not only increase the overall cost of the truck but also require periodic maintenance. Moreover, a failure of the hydraulic system for either the power sling or the dump actuator not only may be hazardous but also prohibits the subsequent detachment or attachment of the truck body until the hydraulic system is repaired.

A still further disadvantage of the previously known detachable truck body systems of the latter type is that both the detachment and attachment of the truck body from and to the truck bed is a time consuming and tedious operation.

SUMMARY OF THE PRESENT INVENTION

The present invention solves the above mentioned disadvantages of the previously known detachable truck body systems by providing a detachable truck body which may be attached to and detached from a truck bed without the necessity of a crane to lift the truck body onto the truck bed and without the necessity of equipping the truck bed with complex and expensive hydraulic dump actuators and power slings.

In brief, the detachable truck body of the present invention comprises a substantially horizontal base adapted for attachment to the bed of a truck. A support leg is secured to the base adjacent each corner thereof and is pivotal between a first and second position. In their first pivotal position the support legs extend downwardly and laterally outwardly from the base of the truck body to engage a ground supporting surface and maintain the base, and hence the truck body, in an elevated position while bracing the truck body base against lateral movement. In their second position the support legs are in a substantially horizontal position adjacent and underneath the base of the truck body so that the truck body can be transported and carried by the truck without interference from the support legs. Locking means are provided for locking the support legs in either their first or second pivotal position.

With the support legs in their first pivotal position, the support legs maintain the truck body in an elevated position so that the bed of a truck may be positioned beneath the base of the truck body. Hydraulic actuators on the truck bed extend upwardly, contact and lift the truck body slightly from the ground. With the truck body so elevated, the load on the support legs is relieved so that the support legs may be moved from their first to their second position horizontally underneath the base of the truck body. The truck body is then lowered by the hydraulic actuators on the truck bed until the truck body sits on the truck bed whereupon the truck with the attached truck body is transported to the desired location.

When detachment of the truck body from the truck body bed is desired, the hydraulic actuators of the truck bed again extend and lift the truck body vertically upwardly from the truck bed. With the truck body elevated, the support legs are moved to their first or downwardly extending pivotal position and locked into place. As the hydraulic actuators on the truck bed are retracted, the support legs contact the ground supporting surface and maintain the truck body in an elevated position. After the truck is driven away, the truck body remains stationary in its elevated position and ready for subsequent attachment to the same or a different truck bed.

BRIEF DESCRIPTION OF THE DRAWINGS

A better understanding of the present invention will be had upon reference to the following detailed description when read in conjunction with the accompanying drawing wherein like reference characters refer to like parts of the several views and in which:

FIG. 1 is a side plan diagrammatic view showing a first step in attaching the detachable truck body of the present invention onto the bed of a truck;

FIG. 2 is a diagrammatic view similar to FIG. 1, but showing a second step thereof;

FIG. 3 is a diagrammatic view similar to both FIGS. 1 and 2 but showing a still further step thereof;

FIG. 4 is a side plan view showing one support leg of the detachable truck body of the present invention and enlarged for clarity;

FIG. 5 is a front plan view showing one support leg of the detachable truck body of the present invention;

FIG. 6 is a bottom plan view of one support leg of the detachable truck body of the present invention taken substantially along line 6—6 in FIG. 5;

FIG. 7 is a fragmentary perspective view showing one support leg locking mechanism for the detachable truck body of the present invention; and FIG. 8 is a fragmentary perspective view showing the other support leg locking mechanism for the detachable truck body of the present invention.

DETAILED DESCRIPTION OF THE PRESENT INVENTION

The detachable truck body 10 of the present invention is illustrated in FIGS. 1-3 and comprises a generally horizontal rectangular base 12. The truck body 10 may include side walls 14, shown in fragmentary form, as desired or demanded by the cargo (not shown) transported by the truck body 10.

Still referring to FIGS. 1-3, the base 12 is supported in a horizontally elevated position by four downwardly extending support legs 16 (only two of which are shown) with two support legs 16 secured to each lateral side of the truck body base 12. With the base 12 supported in an elevated position as shown in FIG. 1, the bed 18 of a truck 20 may be positioned underneath the base 12 without moving the truck body 10. In addition, preferably the truck bed 18 is similar to the truck system described in copending patent application Ser. No. 660,126 which was filed on Feb. 23, 1976, and which is of common ownership with the present invention. As such, the truck bed 18 includes vertical hydraulic actuators 22 with pistons 24 which extend vertically upwardly from the bed 18 upon actuation of the hydraulic actuators 22.

Each of the support legs 16 is substantially identical to the other support legs 16 so that only one support leg 16 will be described in detail for the sake of brevity. Referring now to FIGS. 4 and 5, the support leg 16 comprises an upper leg section 26 constructed of square tubular steel and a lower leg section 28 also constructed of square tubular steel and which is slidably received within the interior of the upper leg section 26. A conventional foot 30 is secured across the outwardly extending end of the lower leg section 28 by welds 32 or the like and is adapted to engage a ground supporting surface 34 as shown in FIGS. 1-3.

As best shown in FIG. 5, with the support leg 16 in its downwardly extending position, the support leg 16 also extends laterally outwardly from the truck body base 12. The support legs thus act as a brace and effectively prevent lateral movement of the truck body 10.

With reference to FIGS. 4-6, a flanged lateral support 40 is secured to the upper end of the upper leg section 26 by ribs 42 and abuts against the bottom surface 38 of the truck body base 12 when the support leg 16 is in its downwardly extending pivotal position. One side of an articulated interdigital hinge 44 is secured to one rib 42 on the flange 40 by support ribs 45 while the other side of the hinge 44 is secured by support ribs 46 to the bottom surface 38 of the truck body base 12. The support ribs 46 are preferably attached by welds 48 to the truck body base 12 and to the hinge 42 while likewise the support ribs 45 are attached by welds 50 to the hinge 44 and support ribs 42. Each support leg 16 is thus pivotally attached to the truck body base 12 by the hinge 44 and movable between a first, or downwardly extending, pivotal position illustrated in FIG. 1 and a second or horizontal pivotal position adjacent and underneath the truck body base 12 as shown in FIG. 3. Moreover, as best shown in FIG. 6, the axis of the hinge 44 intersects the longitudinal axis of the truck body base 12 by an angle X so that with the support leg 16 in its second position, the axis of the support leg 16 is substantially parallel to the axis of the truck body base 12.

With the support leg 16 in its first, or downwardly extending, pivotal position, the upper surface of the flange 40 abuts against the lower surface 38 of the truck body base 12. The flange 40 with the attached ribs 42 thus not only increases the rigidity of the support legs 16 but also limits the rotational travel of the support legs 16. Conversely, the support legs 16 may be pivoted around the hinge 44 to a generally horizontal position such that the support leg 16 is generally horizontal to and underneath the lower surface 38 of the base 12 as previously described. A spring 50 under tension is secured at one end by a tang 52 to the flange 40 and at its other end by a hook 54 to the truck body base 12. The spring 50 urges the support leg 16 from its first to its second rotational position for a purpose which will be later described.

Locking means 56, best shown in FIGS. 5-7, are provided to retain the support leg 16 in its first or downwardly extending pivotal position. The locking means 56 comprises a housing 58 having one side portion 60 secured to the upper leg section 26. Three spaced and parallel members 62, 64, and 66 extend generally perpendicularly outwardly from the side portion 60 of the housing 58. Registering bores 68, 70, and 72 are formed perpendicularly through the members 62, 64, and 66, respectively, and receive a pin 74 therethrough. A helical spring 76 under compression is disposed around the pin 74 between the members 62 and 64 and urges a stop pin 78 transversely disposed through the pin 74 against the member 64. The stop pin 78 thus not only limits the travel of the pin 74 within the housing 58 but also acts as a spring stop for the spring 76. A handle 80 is attached to the outwardly extending portion of the pin 74 and provides a means whereby the pin 74 may be manually retracted from the aperture 72 in the member 66.

A downwardly extending longitudinal flange 82 is secured by welds 84 to the bottom surface 38 of the truck body base 12. The flange 82 is preferably reinforced by a lateral supporting flange 86 attached by welds 88 (FIG. 5) to the first flange 82 and by welds 90 (FIG. 6) to the bottom surface 38 of the body base 12. Referring to FIG. 7, an aperture 92 is provided through the lower depending end 91 of the flange 82. As the support leg 16 is moved toward its downwardly extending position and with the pin 74 retracted from the aperture 72, the lower depending end 91 of the flange 82 is received between the members 64 and 66 respectively. The handle 80 of the pin 74 is then released and the spring 76 urges the pin 74 through the apertures 92 and 72 in the support flange 82 and member 66 to thereby lock the support leg 16 to the flange 82 in its downwardly extending position.

Referring to FIG. 8, to lock the support leg 16 in its second or horizontal position, a hanger 94 is secured to the upper section 26 of the support leg 16 on the side opposite from the locking means housing 58. The hanger 94 engages and cooperates with a hook 96 pivotally mounted by a pin 98 to a framing member 99 on the truck body base 12. With the hook 96 engaging the hanger 94, as shown in FIG. 8, the hook 96 retains the support leg 16 underneath and adjacent the truck body base 12.

The previously described spring 50 urges the support leg 16 toward its horizontal position since, in practice, it has been found to be easier for an operator to move the support leg 16 from the horizontal to the downwardly extending vertical position against the spring 50 than vice versa. The spring 50 in effect offsets the weight of the support leg 16.

Referring to FIGS. 4 and 5, the lower section 28 of the support legs 16 is preferably axially adjustable within the upper section 26 of the support leg 16. To achieve this, a plurality of axially spaced transverse bores 102 are formed through the lower section 28. The bores 102 sequentially register with registering transverse bores 104 formed through the upper section 26 of the support leg 16 as the lower section 28 is slidably adjusted in the upper section 26. When the lower leg section 28 is adjusted to the desired axial position within the support leg upper section 26, a pin 102 having an enlarged head 108 is inserted through the registering bores 104 and 106 to lock the upper section 26 to the lower section 28. A spring clip 110 is secured to the head 108 of the pin 106 and hookingly engages the opposite end of the pin 106 to thereby retain the pin 106 within the bores 104 and 102.

In operation assuming that the support legs 16 are in their first or downwardly extending position and supporting the base 12 in an elevated horizontal position, the bed 18 of the truck 20 is first positioned underneath the truck body base 12 as shown in FIG. 1. The hydraulic actuators 22 are then actuated extending the pistons 24 vertically upward. The pistons 24 engage and lift the body 10 off from the ground supporting surface 34. With the feet 30 of the support legs 16 elevated, the pin 74 in each of the locking means 56 is retracted and the support legs 16 are swung upwardly with the aid of the spring 50 to their second, or horizontal position. Each leg 16 is locked into its second position by the hook 96 as has been previously described. The hydraulic actuators 22 are again actuated thus retracting the pistons 24 and lowering the truck body 10 onto the truck bed 18 as shown in FIGS. 2 and 3. The truck body 10 is locked onto the truck bed 18 by any appropriate means such as that described in the aforementioned patent application and the truck body 10 is thereafter transported to the desired destination.

If detachment of the truck body 10 from the truck bed 18 is desired, the hydraulic actuators 22 are again actuated thus extending the pistons 24 upwardly. The pistons 24 contact and lift the base 12 of the truck body vertically upward from the truck bed 18. With the base 12 elevated, each support leg 16 is unlocked from the hook 96 and swung to its first or downwardly and laterally outwardly extending position and locked to the flange 82 by the locking means 56 as has been previously described.

With each support leg 16 locked in its downwardly extending position the hydraulic pistons 24 are then retracted until the support legs 16 engage the ground supporting surface 34. As the pistons 24 are further retracted, the support legs 16 maintain the truck body 10 in an elevated position and brace the truck body 10 against lateral movement so that the truck 20 may be driven away from underneath the truck body 10. The subsequent attachment of the truck body 10 to the truck bed 18 has been previously described.

It can thus be seen that the detachable truck body 10 of the present invention provides a novel and yet inexpensive means for detachably mounting a truck body onto the bed of a truck. In particular, the previously known separate crane to lift the detached truck body 10 upon the truck bed 18 is rendered unnecessary. Moreover, the truck body 10 of the present invention renders unnecessary the previously known truck beds with hydraulic dump actuators and power slings which drag a detached truck body up onto the bed of the truck. In addition, the adjustability of the longitudinal length of the support legs permits use of the detachable truck body 10 of the present invention with a wide variety of different truck beds.

Having thus described my invention many modifications thereto will become apparent to those skilled in the art to which it pertains without deviation from the spirit of the invention as defined by the scope of the appended claims.

What is claimed is:

1. A detachable truck body adapted to be mounted onto the bed of a truck comprising:
   a substantially horizontal base,
   at least one support leg;
   an interdigital articulated hinge for pivotally securing said support leg to said base, said support leg being movable between a first and second pivotal position, wherein in said first pivotal position each of said support legs extends downwardly and laterally outwardly from said base to engage a ground supporting surface to maintain said base in an elevated position, wherein in said second position each of said support legs are in a substantially horizontal position adjacent and underneath said base,
   first means for locking each of said support legs in said first pivotal position, and
   second means for locking each of said support legs in said second pivotal position.

2. The invention as defined in claim 1 and including two longitudinally spaced support legs on each lateral side of said base.

3. The invention as defined in claim 1 wherein said first locking means comprises an axially adjustable pin mounted within a housing secured to said support leg, wherein said pin registers with an aperture formed in a flange member secured to said base when said support leg is in its first pivotal position.

4. The invention as defined in claim 3 and including resilient means for urging said pin through said aperture.

5. The invention as defined in claim 1 and including resilient means for urging said support leg from its first to its second pivotal position.

6. The invention as defined in claim 5 wherein said resilient means is a spring disposed between said base and said support leg.

7. The invention as defined in claim 1 wherein said second locking means comprises a pivotally mounted hook attached to said base and adapted to hookingly engage a hanger attached to said support leg when said support leg is in its second pivotal position.

8. The invention as defined in claim 1 wherein said support leg comprises an outer elongated section and an inner elongated section axially slidably received in said outer section, and means for locking the axial position of said inner section within said outer section.

9. The invention as defined in claim 8 wherein said last mentioned means comprises a pair of registering transverse apertures transversely formed through one of said sections, and a plurality of axially spaced pairs of transverse apertures formed through the other section whereby said latter apertures sequentially register with said former apertures as said inner section is axially adjusted within said outer section, and a pin disposed through registering apertures in said inner and outer sections.

10. The invention as defined in claim 9 wherein said first mentioned apertures are formed in said outer section.

11. A detachable truck body adapted to be mounted onto the bed of a truck comprising:
a substantially horizontal base,
at least one support leg;
means for pivotally securing said support leg to said base, said support leg being movable between a first and second pivotal position, wherein in said first pivotal position each of said support legs extends downwardly and laterally outwardly from said base to engage a ground supporting surface to maintain said base in an elevated position, wherein in said second position each of said support legs are in a substantially horizontal position adjacent and underneath said base, and wherein the pivotal axis of said pivot means is parallel to the plane of said base but intersects the longitudinal axis of said truck body at an acute angle whereby the longitudinal axis of said support leg is substantially parallel to the longitudinal axis of said truck when said support leg is in its second pivotal position,
first means for locking each of said support legs in said first pivotal position, and
second means for locking each of said support legs in said second pivotal position.

12. The invention as defined in claim 11 wherein said pivot means comprises a hinge.

13. The invention as defined in claim 12 wherein said hinge is an interdigital articulated hinge.

14. The invention as defined in claim 1 wherein the axis of said hinge intersects the longitudinal axis of said truck body at an acute angle whereby the axis of said support leg is substantially parallel to the axis of said truck body when said support leg is in its second pivotal position.

15. The invention as defined in claim 11 and including two longitudinally spaced support legs on each lateral side of said base.

16. The invention as defined in claim 11 wherein said first locking means comprises an axially adjustable pin mounted within a housing secured to said support leg, wherein said pin registers with an aperture formed in a flange member secured to said base when said support leg is in its first pivotal position.

17. The invention as defined in claim 16 and including resilient means for urging said pin through said aperture.

18. The invention as defined in claim 11 and including resilient means for urging said support leg from its first to its second pivotal position.

19. The invention as defined in claim 18 wherein said resilient means is a spring disposed between said base and said support leg.

20. The invention as defined in claim 11 wherein said support leg comprises an outer elongated section and an inner elongated section axially slidably received in said outer section, and means for locking the axial position of said inner section within said outer section.

21. The invention as defined in claim 20 wherein said last mentioned means comprises a pair of registering transverse apertures transversely formed through one of said sections, and a plurality of axially spaced pairs of transverse apertures formed through the other section whereby said latter apertures sequentially register with said former apertures as said inner section is axially adjusted within said outer section, and a pin disposed through registering apertures in said inner and outer sections.

22. The invention as defined in claim 21 wherein said first mentioned apertures are formed in said outer section.

* * * * *

UNITED STATES PATENT AND TRADEMARK OFFICE
CERTIFICATE OF CORRECTION

PATENT NO. : 4,076,299

DATED : February 28, 1978

INVENTOR(S) : Thomas B. Dalton

It is certified that error appears in the above–identified patent and that said Letters Patent are hereby corrected as shown below:

Col. 5, line 13, delete "102", insert --106--;

line 15, delete "106", insert --102--.

Signed and Sealed this

Twentieth Day of June 1978

[SEAL]

Attest:

RUTH C. MASON
*Attesting Officer*

DONALD W. BANNER
*Commissioner of Patents and Trademarks*